United States Patent [19]

Burns

[11] Patent Number: 4,930,887
[45] Date of Patent: Jun. 5, 1990

[54] APPARATUS AND METHOD FOR ALIGNING RING RESONATOR

[75] Inventor: Richard H. Burns, Los Angeles, Calif.

[73] Assignee: The United States of America as represented by the Secretary of the Army, Washington, D.C.

[21] Appl. No.: 277,591

[22] Filed: Nov. 25, 1988

[51] Int. Cl.$^5$ .......................... G01B 11/26; G01B 9/02
[52] U.S. Cl. ..................................... 356/152; 356/350; 356/400; 250/233; 250/237 R
[58] Field of Search ..................... 356/350, 400, 152; 372/94; 250/233, 237 R

[56] References Cited

U.S. PATENT DOCUMENTS

| | | | |
|---|---|---|---|
| 3,544,801 | 12/1970 | Dyck | 356/400 X |
| 3,773,421 | 11/1973 | Gievers | 356/152 |
| 4,850,708 | 7/1989 | Moore et al. | 356/152 X |

Primary Examiner—Thomas H. Tarcza
Assistant Examiner—Linda J. Wallace
Attorney, Agent, or Firm—Hay Kyung Chang; Freddie M. Bush

[57] ABSTRACT

Aligning a stable ring resonator by the use of an inversion mechanism inside the resonator and a pair of anti-symmetric masks. Each mask has opaque and clear parts and the masks are anti-symmetric in that, in use, one mask is positioned so that its opaque and clear parts are anti-symmetric to the opaque and clear parts of the other mask when it is in position. One mask is placed between the radiation source and the beam splitter while the other mask is placed between the beam splitter and the focal plane on which the two beam portions created by the beam splitter focus. One beam portion is directly reflected from the beam splitter and the other portion is transmitted into the resonator and is inverted while following a beam path within the resonator before being outcoupled through the beam splitter in a much weakened state. Thusly positioned, the anti-symmetric masks have the effect to attenuating the intensity of the reflected beam portion, so that the relative intensities of the transmitted and the reflected beam portions are more equal when they arrive at the focal plane. This, in turn, makes the alignment of the two focal spots easy. When the two spots merge completely the ring resonator is aligned.

10 Claims, 3 Drawing Sheets

APPARATUS AND METHOD FOR ALIGNING RING RESONATOR

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In a stable ring resonator, the only coupling of light into and out of the resonator is through the outcoupler beam splitter. Alignment of the resonator is accomplished by manipulating the mirrors of the resonator until the wavefront that has gone once around in the resonator and coupled out through the beam splitter is identical to the wavefront that has simply reflected from the reflective surface of the beam splitter. This identity will be manifest in the complete overlapping of the spots created by the two wavefronts in the focal plane of an alignment telescope. However, this procedure is difficult to use because when the beam splitter has a high reflectivity (as is usually the case), the directly reflected wavefront may have several orders of magnitude greater intensity than the wavefront that has gone once around in the resonator and coupled out through the beam splitter, making observation of their relative alignment difficult.

SUMMARY OF THE INVENTION

A set of anti-symmetric masks are used on both the alignment wavefront source and the alignment telescope to attenuate the intensity of the directly reflected wavefront. Thus the intensities of the beam that has once gone around in the resonator and out through the beam splitter and of the beam that is directly reflected from the beam splitter are equalized, making it possible to observe with ease the alignment of the spots on focal plane sensor.

DESCRIPTION OF THE PREFERRED EMBODIMENT

Figure 1:
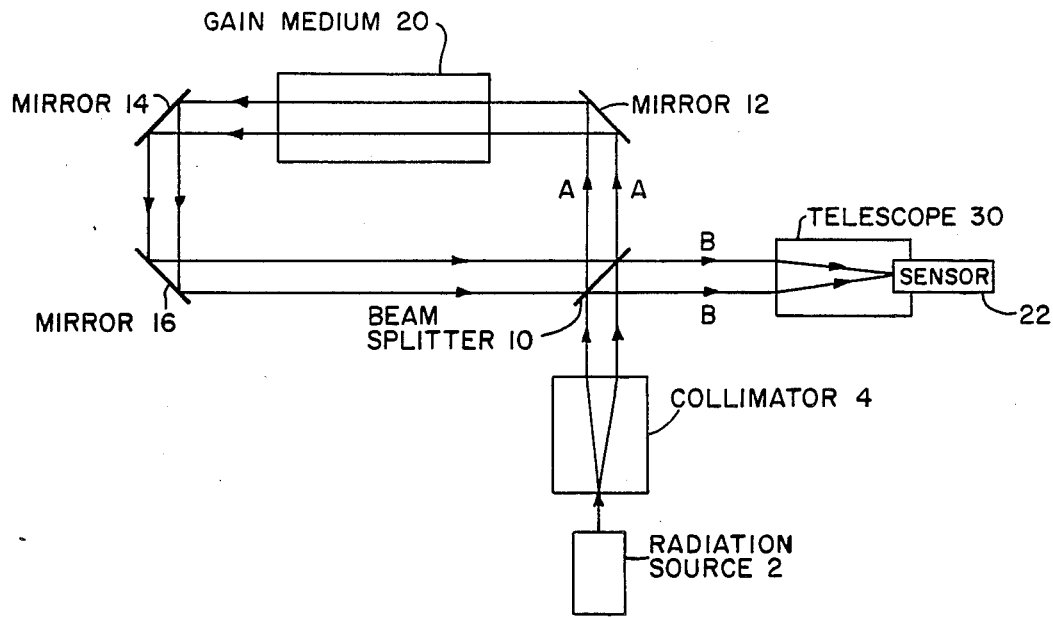
FIG. 1 is a diagram of a stable ring resonator.
Figure 2:
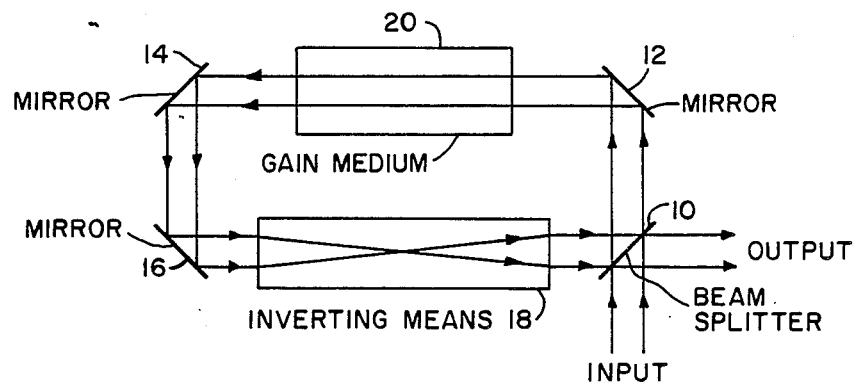
FIG. 2 is a diagram of a stable ring resonator with an inversion mechanism.

Referring now to the drawings wherein like numbers refer to like parts, FIG. 1 discloses a typical stable ring resonator which can be aligned by adjusting one or more of mirrors 12, 14, 16 until the images formed by the two beam portions overlap on a sensor 22 of the telescope 30. The two beam portions result when an incoming beam from a radiation source 2 hits a partially transmitting, partially reflective beam splitter 10 after passing through collimator 4. A portion of the original beam is transmitted through the beam splitter and another portion of the beam is reflected from the reflective surface of the beam splitter, as indicated by arrows A and B respectively, thus resulting in two beam portions. Gain medium 20 provides energy to laser beam passing through it during operation of the ring resonator. However, it is not normally active during the alignment of the resonator. In FIG. 2, a stable ring resonator with an inversion means is shown. The inversion means 18 inverts an image so that when the image arrives back at the beam splitter after having gone once around within the resonator, the image is inverted from the state in which it started the travel from the beam splitter. Typically, a stable ring resonator is aligned by manipulating one or more mirrors 12, 14, 16 until the images formed by the two beam portions overlap on a sensor. This method is unsatisfactory because of the large difference in brightness of the spots created by the two beam portions on the sensor of the telescope, making observation of the two spots difficult. Therefore the alignment of the ring resonator by observation of the spots is also difficult.

Figure 3:
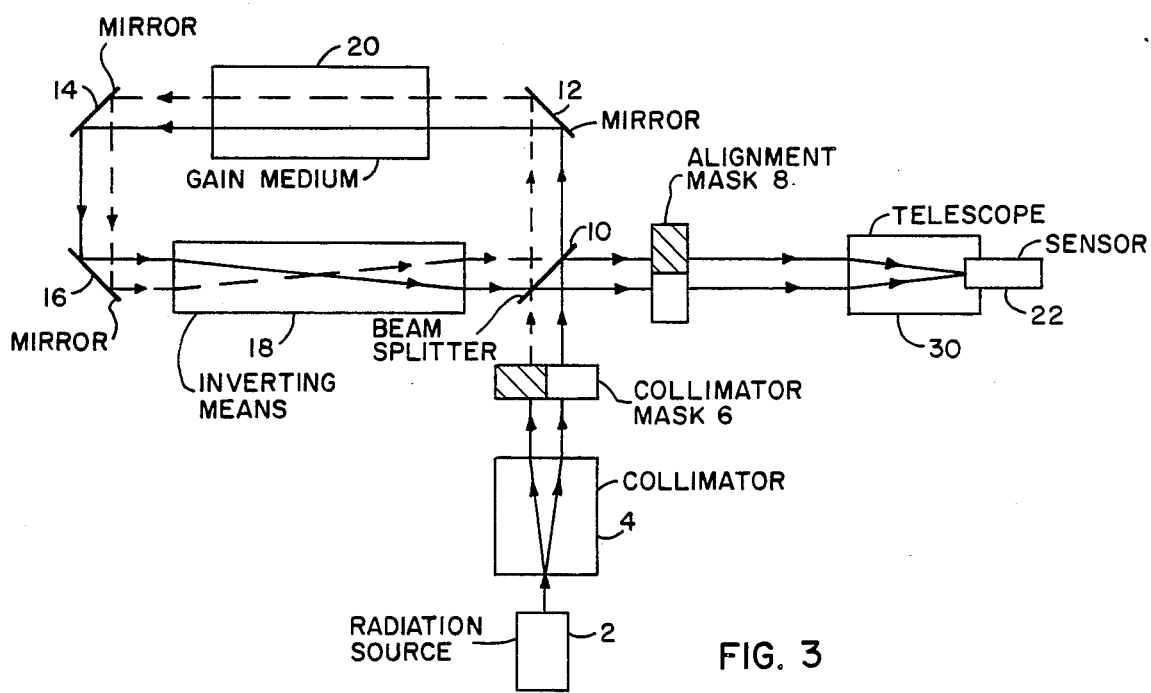
FIG. 3 is a diagram of a preferred embodiment of applicants' invention to align a stable ring resonator with use of anti-symmetric masks.

Now referring to FIG. 3, which embodies the present invention, the following is a description of the paths followed by the original beam and the two resulting beam portions and how the anti-symmetric masks are used to align a stable ring resonator.

A beam of radiation is directed from a radiation source 2 through a collimator 4 and a collimator mask 6 toward beam splitter 10. The collimator mask 6 comprises opaque and clear parts, the opaque part admitting only a fraction of the radiation whereas the clear part admits essentially all radiation coming through it. The path of the fraction of radiation that passes through the opaque part of the collimator mask is indicated by a broken line and the path of the radiation that passes through the clear part is indicated by a solid line in FIG. 3.

After passing through the collimator mask 6, the beam of radiation consisting of the broken and solid line paths impinges on the beam splitter 10 and each path is further split into two beam portions, one that is transmitted into the resonator and the other that is reflected off of the reflective surface of the beam splitter. Inside the ring resonator, the part of radiation that passes through the opaque part of the mask 6 and the part of radiation that passes through the clear part of collimator mask 6 follow their paths indicated by broken and solid lines, respectively, until they reach the inversion means 18. This inversion means, which may comprise lenses or mirrors, inverts the broken and solid line paths and, in this inverted state, the beam paths strike the beam splitter 10 and are outcoupled through it, toward the alignment telescope. Now, because of the inversion, the part of the beam that originally passes through the clear part of collimator mask 6, indicated by the solid line inside the ring resonator, passes through the clear part of telescope alignment mask 8 which is positioned so that its clear and opaque parts are anti-symmetric to the clear and opaque parts of collimator mask 6. The solid line path portion of the original beam that is reflected off of the beam splitter 10 goes directly through the opaque part of alignment mask 8, whereas the reflected portion of the broken line beam path passes through the clear part of alignment mask 8. Therefore, the two solid line paths representing the portion that has once gone around within the resonator and the portion that is directly reflected off of the beam splitter pass through the clear and opaque parts, respectively, of the alignment mask 8 and focus on position sensor 22 of telescope 30. Because the solid line path beam portion that went once around within the ring resonator passes entirely through the clear part of alignment mask 8 while the reflected (greater intensity) beam portion is attenuated by the opaque portion of mask 8, the relative intensities of these two beam portions are substantially equalized. This makes the focusing spots of these two beam portions on sensor 22 more equal in brightness than they would be without the use of the collimator and alignment masks 6, 8. The relative equality in brightness, in turn, makes easy the observation of their alignment on the position sensor 22. The mirrors 12, 14, 16 are adjusted until the two spots completely overlap on the sensor, indicating alignment of the ring resonator.

The same principle applies when the non-clear part of the masks 6, 8, are not opaque but completely block out radiation; then the light-blocking part of the mask 8 may be turned slightly from the position that is totally anti-symmetric to the light-blocking part of mask 6. This allows a fraction of the radiation reflected from the beam splitter to pass through the mask 8 and focus on sensor 22, so that there are two observable light spots on the sensor to be used in alignment.

Figure 4:
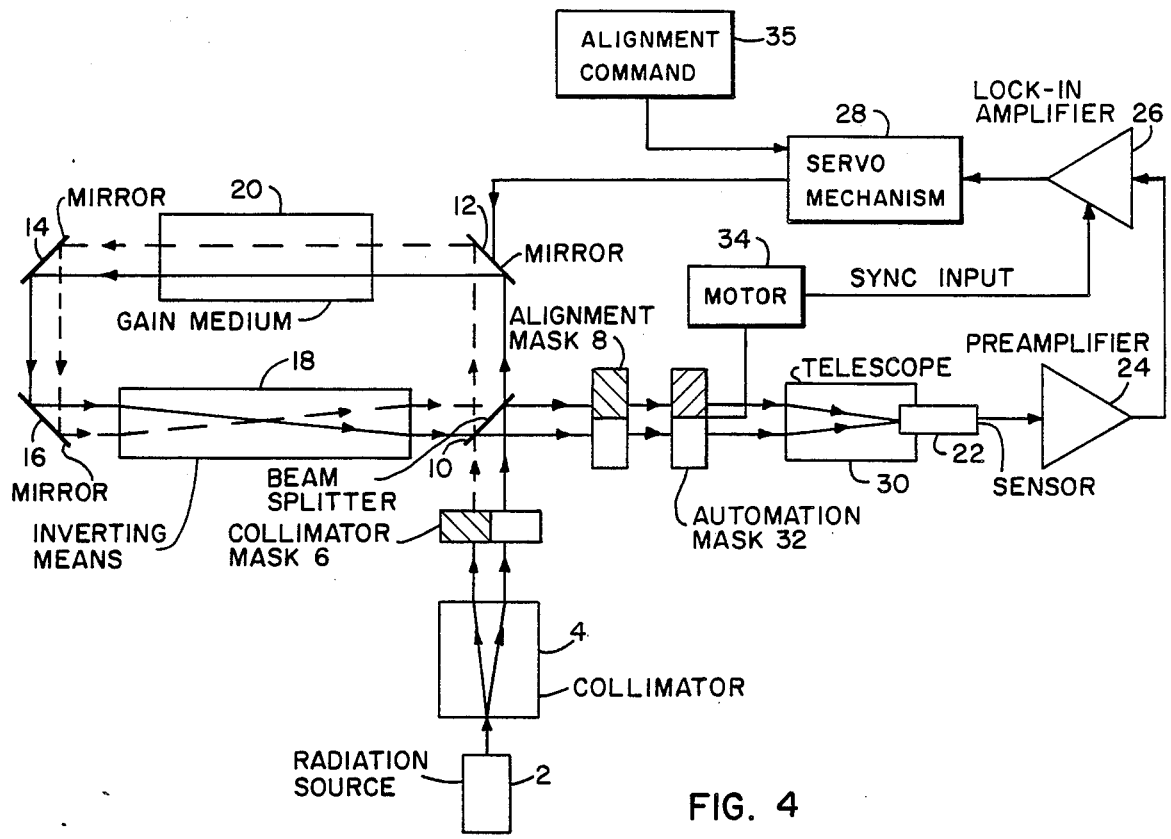
FIG. 4 is an illustration of automation of the alignment process.
Figure 5A:
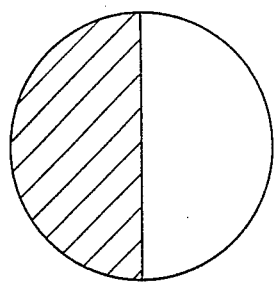
FIGS. 5A–5C' are drawings depicting some representative pairs of anti-symmetric masks suitable for use with applicants' invention.
Figure 5A:
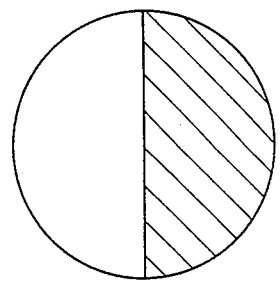
Figure 5B:
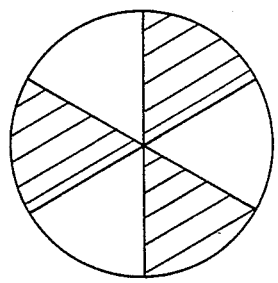
Figure 5B:
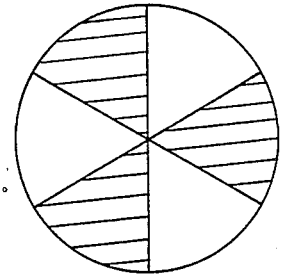
Figure 5C:
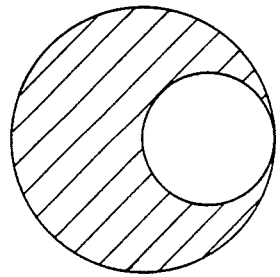
Figure 5C:
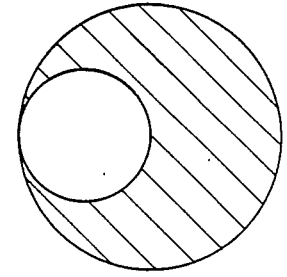

As illustrated by FIG. 4, the method for aligning a stable ring resonator may be automated, so that an observer need not be present, by using an automation mask 32 positioned between the alignment mask 8 and the alignment telescope 30. The mask 32 comprising opaque and clear parts or completely light-blocking and clear parts is spun about its horizontal axis by a motor 34 causing the spot on the sensor 22 to blink between the transmitted and the reflected beams. This chopping effect is then used to automate the alignment process by coupling the output from the position sensor 22 to a pre-amplifier 24 and a lock-in amplifier 26. The motor speed synchronization signal is coupled to lock-in amplifier 26 for synchronization with the output from the pre-amplifier. The output of the lock-in amplifier 26 indicates the direction and magnitude of any resonator misalignment. On command from a human operator or supervisory computer 35, the servo mechanism 28 causes one or more of mirrors 12, 14 and 16 to move in a direction to reduce the alignment error to zero and to hold it at zero as long as it is desired. This holding feature is particularly significant for large ring resonators which may be subject to external vibrations and thermal drifts which would otherwise cause the resonator to go out of alignment. FIGS. 5A-5C' show some typical examples of sets of anti-symmetric masks 6 and 8 that may be used with this invention. Mask 5A works with mask 5A', mask 5B works with mask 5B', and mask 5C works with mask 5C'. For each pair of masks to be used, at least one mask of the pair must be capable of being rotated so that it may be positioned to be geometrically anti-symmetric to the other mask.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A device for aligning a ring resonator, comprising: a ring resonator having a plurality of adjustable mirrors for directing beams through said resonator, a beam splitter for dividing an impinging beam of radiation into transmitted and reflected beam portions, said transmitted portion being directed through said resonator and outcoupled through said beam splitter for subsequent recombination with said reflected beam portion, means for inverting said transmitted beam portion within said resonator, a source of radiation for producing a beam, a first mask, means for directing said beam from said source toward said first mask, said first mask being suitably disposed between said means for directing and said beam splitter to attenuate intensity of a portion of said beam from said source, said mask disposition permitting rotation of said mask in the plane perpendicular to the beam path from said source, a second mask disposed adjacent to said beam splitter in the path of the recombined beam consisting of said transmitted and reflected beam portions to attenuate intensity of said reflected beam portion, said second mask disposition permitting rotation of said second mask in the plane perpendicular to the beam paths from said beam splitter, and means for focusing and sensing said transmitted and reflected beam portions after passing through said second mask for materializing said beam portions in the form of spots, said focusing and sensing means being located along a linear path of said transmitted and reflected beam portions after passing through said second mask.

2. A device as defined in claim 1 wherein said means for directing said beam from said source to said beam splitter is a collimator and said means for focusing and sensing is an alignment telescope containing a sensor therein suitable for receiving said transmitted and reflected beam portions from said beam splitter.

3. A device as defined in claim 2 wherein said reflected beam portion, after reflecting from said beam splitter, proceeds toward said second mask, passes therethrough and further proceeds toward said alignment telescope.

4. A device as defined in claim 3 wherein said first and second masks each comprises opaque and clear parts, said opaque and clear parts of said first mask being for dividing an impinging beam into a first beam portion that passes through said clear part of said first mask and a second beam portion that passes through said opaque part of said first mask, said beam splitter dividing said first and second beam portions impinging thereon, said beam splitter further dividing said first beam portion into a first transmitted beam portion and a first reflected beam portion and further dividing said second beam portion into a second transmitted beam portion and a second reflected first reflected beam portion passes through said opaque part of said second mask, said second transmitted beam portion passes through said opaque part of said second mask, and said second reflected beam portion passes through said clear part of said second mask.

5. A device as defined in claim 1 and further having a third mask positioned in the beam path between said second mask and said focusing means, and a means for rotating said third mask and automatically adjusting said ring resonator.

6. A device as defined in claim 5 wherein said rotating and adjusting means comprises a pre-amplifier coupled to receive an output from said focusing means, a lock-in amplifier coupled to receive an output from said pre-amplifier, a servo mechanism coupled to receive an output from said lock-in amplifier, a means to command said servo-mechanism, said servo-mechanism being further coupled to adjust one or more of said mirrors in response to said command means, and a motor coupled between said third mask and said lock-in amplifier for synchronization of rotation of said third mask with the output from said pre-amplifier.

7. A device as defined in claim 6 wherein said means for directing said beam from said source to said beam splitter is a collimator and said means for focusing and sensing is an alignment telescope containing a sensor therein suitable for receiving said transmitted and reflected beam portions from said beam splitter.

8. A device as defined in claim 7 wherein said reflected beam portion, after reflecting from said beam splitter, proceeds toward said second mask, passes therethrough and further proceeds toward said alignment telescope.

9. A method for aligning a ring resonator having a plurality of mirrors and a beam splitter therein, comprising the steps of: directing a beam of radiation from a source through a first mask toward said beam splitter, dividing by said beam splitter said beam into transmitted and reflected beam portions traversing separate paths, guiding said transmitted beam portion along a beam path within said resonator, inverting said transmitted beam portion within said resonator prior to outcoupling said beam portion through said beam splitter, recombining said outcoupled transmitted beam portion with said reflected beam portion, passing said recombined beam portions through a second mask, monitoring on a position sensor inside a telescope transmitted and reflected beam portions impinging on said sensor, and merging on said sensor two spots created by said transmitted and reflected beam portions.

10. A method for aligning a ring resonator as set forth in claim 9 wherein said merging step further comprises the step of adjusting one or more of said mirrors until said two spots overlap on said sensor indicating alignment of the ring resonator.

* * * * *